(12) United States Patent
Tada (10) Patent No.: US 11,372,241 B2
(45) Date of Patent: Jun. 28, 2022

(54) SAMPLE IMAGING APPARATUS

(71) Applicant: FUJIFILM Corporation, Tokyo (JP)

(72) Inventor: Takuji Tada, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 392 days.

(21) Appl. No.: 16/581,710

(22) Filed: Sep. 24, 2019

(65) Prior Publication Data

US 2020/0103648 A1 Apr. 2, 2020

(30) Foreign Application Priority Data

Sep. 27, 2018 (JP) .............................. JP2018-183004

(51) Int. Cl.
| | | |
|---|---|---|
| *G02B 27/00* | (2006.01) | |
| *G01N 21/64* | (2006.01) | |
| *G02B 21/16* | (2006.01) | |
| *G02B 21/36* | (2006.01) | |

(52) U.S. Cl.
CPC ..... *G02B 27/0068* (2013.01); *G01N 21/6458* (2013.01); *G02B 21/16* (2013.01); *G02B 21/36* (2013.01); *G01N 2201/0638* (2013.01)

(58) Field of Classification Search
CPC .... G02B 27/0068; G02B 21/16; G02B 21/36; G01N 21/6458; G01N 2201/0638; G01N 2021/6478; G01N 21/6456; G01N 21/76
See application file for complete search history.

(56) References Cited

U.S. PATENT DOCUMENTS

| | | |
|---|---|---|
| 6,674,574 B1 | 1/2004 | Aono |
| 9,127,302 B2 | 9/2015 | Verrant et al. |
| 9,531,950 B2 | 12/2016 | Tanaka et al. |
| 9,957,571 B2 | 5/2018 | Verrant et al. |

(Continued)

FOREIGN PATENT DOCUMENTS

| | | | | |
|---|---|---|---|---|
| CN | 102970917 A | * | 3/2013 | ............. A61B 6/037 |
| JP | H05297437 | | 11/1993 | |

(Continued)

OTHER PUBLICATIONS

Wenqin "Structure and dynamics in live bacteria revealed by super-resolution fluorescence microscopy", Dissertation, Department of Physics, Harvard University, Graduate School of Arts and Sciences, Apr. 16, 2012, p. 1-24 (Year: 2012).*

(Continued)

*Primary Examiner* — David P Porta
*Assistant Examiner* — Mamadou Faye
(74) *Attorney, Agent, or Firm* — JCIPRNET (57) ABSTRACT

The sample imaging apparatus includes: an imaging unit that images a sample by using an achromatic lens in which longitudinal chromatic aberration is corrected in a wavelength range of chemiluminescent light of the sample; an excitation light source (the first epi-illumination light source and/or the second epi-illumination light source) that irradiates the sample with excitation light for causing the sample to emit fluorescent light; and an imaging control unit that adjusts a focal length of the achromatic lens in each imaging in a case of imaging the single sample a plurality of times by changing a wavelength range of the fluorescent light emitted by the sample, and performs imaging in a wavelength order of the fluorescent light used for the imaging.

12 Claims, 7 Drawing Sheets

(56) References Cited

U.S. PATENT DOCUMENTS

| | | |
|---|---|---|
| 10,089,768 B2 | 10/2018 | Otsuka et al. |
| 11,015,227 B2 * | 5/2021 | Verrant et al. |
| 2004/0178370 A1 | 9/2004 | Oldham et al. |
| 2005/0269530 A1 | 12/2005 | Oldham et al. |
| 2006/0006067 A1 | 1/2006 | Unger |
| 2007/0030677 A1 | 2/2007 | Oldham et al. |
| 2007/0263209 A1 | 11/2007 | Oldham et al. |
| 2008/0088952 A1 | 4/2008 | Unger et al. |
| 2008/0265139 A1 | 10/2008 | Oldham et al. |
| 2009/0294703 A1 | 12/2009 | Unger et al. |
| 2010/0163710 A1 | 7/2010 | Oldham et al. |
| 2010/0320364 A1 | 12/2010 | Unger et al. |
| 2012/0035080 A1 | 2/2012 | Unger et al. |
| 2012/0264226 A1 | 10/2012 | Unger et al. |
| 2014/0011204 A1 | 1/2014 | Unger et al. |
| 2014/0024559 A1 | 1/2014 | Unger et al. |
| 2014/0218589 A1 | 8/2014 | Hong |
| 2015/0203896 A1 | 7/2015 | Unger et al. |
| 2016/0194685 A1 | 7/2016 | Unger et al. |
| 2017/0059841 A1 * | 3/2017 | Trulson ................ G02B 21/367 |
| 2017/0321249 A1 | 11/2017 | Unger et al. |
| 2019/0153511 A1 | 5/2019 | Unger et al. |

FOREIGN PATENT DOCUMENTS

| | | | |
|---|---|---|---|
| JP | H10268204 | | 10/1998 |
| JP | 2000241352 | | 9/2000 |
| JP | 2001091822 | | 4/2001 |
| JP | 2005043278 A | * | 2/2005 |
| JP | 2006519995 | | 8/2006 |
| JP | 2007003323 | | 1/2007 |
| JP | 2008502027 | | 1/2008 |
| JP | 2008275408 | | 11/2008 |
| JP | 2009523008 | | 6/2009 |
| JP | 2010276362 | | 12/2010 |
| JP | 2015177250 | | 10/2015 |
| WO | 2016013470 | | 1/2016 |

OTHER PUBLICATIONS

CN-102970917-A (Year: 2013).*
Machine translation of CN-102970917-A (Year: 2013).*
JP-2005043278-A (Year: 2005).*
Machine translation of JP-2005043278-A (Year: 2005).*
"Search Report of Europe Counterpart Application", dated Feb. 19, 2020, p. 1-p.10.
"Office Action of Japan Counterpart Application", dated Jul. 6, 2021, with English translation thereof, pp. 1-8.

* cited by examiner

SAMPLE IMAGING APPARATUS

CROSS-REFERENCE TO RELATED APPLICATIONS

This application claims priority under 35 U.S.C § 119(a) to Japanese Patent Application No. 2018-183004 filed on Sep. 27, 2018. The above application is hereby expressly incorporated by reference, in its entirety, into the present application.

BACKGROUND OF THE INVENTION

1. Field of the Invention

The present invention relates to a sample imaging apparatus that irradiates a sample with light in a closed space so as to perform imaging.

2. Description of the Related Art

There is a known imaging apparatus that images a sample by using transmitted light in order to analyze a sample such as biological molecules (JP2015-177250A, corresponding to U.S. Pat. No. 9,531,950B2). This imaging apparatus is able to also perform imaging by using fluorescent light emitted by the sample.

SUMMARY OF THE INVENTION

A sample imaging apparatus that images a sample such as biological molecules, for example, performs imaging by using fluorescent light emitted by the sample in a case where the sample is irradiated with excitation light. In addition, the chemiluminescent light of the sample may be used for imaging.

An object of the present invention is to provide a sample imaging apparatus capable of performing each of imaging using fluorescent light of a sample and imaging using chemiluminescent light of a sample at a high resolution.

According to an aspect of the present invention, there is provided a sample imaging apparatus comprising: an imaging unit that images a sample by using an achromatic lens in which longitudinal chromatic aberration is corrected in a wavelength range of chemiluminescent light of the sample; an excitation light source that irradiates the sample with excitation light for causing the sample to emit fluorescent light; and an imaging control unit that adjusts a focal length of the achromatic lens in each imaging in a case of imaging the single sample a plurality of times by changing a wavelength range of the fluorescent light emitted by the sample, and performs imaging in a wavelength order of the fluorescent light used for the imaging.

It is preferable that in a case where a state of focusing on a long wavelength side changed from a state of focusing on a short wavelength side is compared with the state of focusing on the short wavelength side changed from the state of focusing on the long wavelength side and an error of the focal length is smaller in the state of focusing on the long wavelength side changed from the state of focusing on the short wavelength side, imaging is performed sequentially from imaging using the fluorescent light with a short wavelength.

It is preferable that in a case of performing imaging using fluorescent light of a Cy2 dye and imaging using fluorescent light of a Cy3 dye, the imaging using the fluorescent light of the Cy2 dye is performed, and then the imaging using the fluorescent light of the Cy3 dye is performed.

It is preferable that in a case of performing imaging using fluorescent light of a Cy3 dye and imaging using fluorescent light of a Cy5 dye, the imaging using the fluorescent light of the Cy3 dye is performed, and then the imaging using the fluorescent light of the Cy5 dye is performed.

It is preferable that in a case of performing imaging using fluorescent light of a Cy2 dye and imaging using fluorescent light of a Cy5 dye, the imaging using the fluorescent light of the Cy2 dye is performed, and then the imaging using the fluorescent light of the Cy5 dye is performed.

It is preferable that in a case of performing imaging using fluorescent light of a Cy2 dye, imaging using fluorescent light of a Cy3 dye, and imaging using fluorescent light of a Cy5 dye, first, the imaging using the fluorescent light of the Cy2 dye is performed, second, the imaging using the fluorescent light of the Cy3 dye is performed, and third, the imaging using the fluorescent light of the Cy5 dye is performed.

It is preferable that in a case where a state of focusing on a long wavelength side changed from a state of focusing on a short wavelength side is compared with the state of focusing on the short wavelength side changed from the state of focusing on the long wavelength side and an error of the focal length is smaller in the state of focusing on the short wavelength side changed from the state of focusing on the long wavelength side, imaging is performed sequentially from imaging using the fluorescent light with a long wavelength.

It is preferable that in a case of performing imaging using fluorescent light of a Cy2 dye and imaging using fluorescent light of a Cy3 dye, the imaging using the fluorescent light of the Cy3 dye is performed, and then the imaging using the fluorescent light of the Cy2 dye is performed.

It is preferable that in a case of performing imaging using fluorescent light of a Cy3 dye and imaging using fluorescent light of a Cy5 dye, the imaging using the fluorescent light of the Cy5 dye is performed, and then the imaging using the fluorescent light of the Cy3 dye is performed.

It is preferable that in a case of performing imaging using fluorescent light of a Cy2 dye and imaging using fluorescent light of a Cy5 dye, the imaging using the fluorescent light of the Cy5 dye is performed, and then the imaging using the fluorescent light of the Cy2 dye is performed.

It is preferable that in a case of performing imaging using fluorescent light of a Cy2 dye, imaging using fluorescent light of a Cy3 dye, and imaging using fluorescent light of a Cy5 dye, first, the imaging using the fluorescent light of the Cy5 dye is performed, second, the imaging using the fluorescent light of the Cy3 dye is performed, and third, the imaging using the fluorescent light of the Cy2 dye is performed.

It is preferable that in a case where imaging using the chemiluminescent light of the sample and imaging using the fluorescent light of the sample are performed, the imaging using the chemiluminescent light is performed, and then the imaging using the fluorescent light is performed.

According to the present invention, it is possible to provide a sample imaging apparatus capable of performing each of imaging using fluorescent light of a sample and imaging using chemiluminescent light of a sample at a high resolution.

BRIEF DESCRIPTION OF THE DRAWINGS

FIG. 9 is a flowchart in a case of performing imaging by using chemiluminescent light of a sample or the like.

DESCRIPTION OF THE PREFERRED EMBODIMENTS

Figure 1:
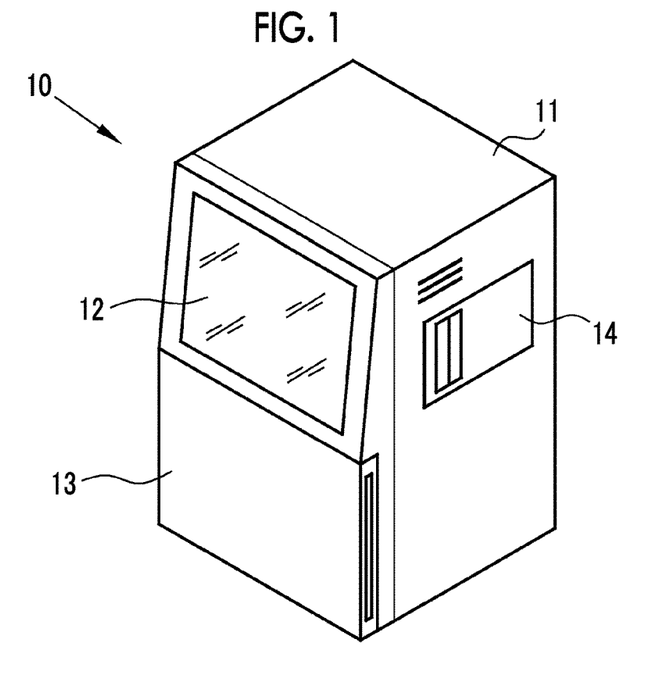
FIG. 1 is an external view of a sample imaging apparatus.

As illustrated in FIG. 1, a sample imaging apparatus 10 is an apparatus that images a sample 40 (refer to FIG. 2) such as biological molecules in a housing 11 forming a closed space. The housing 11 has a substantially rectangular parallelepiped shape, and has a touch panel 12 on the upper front side. The touch panel 12 is an operation unit and a display unit of the sample imaging apparatus 10. The touch panel 12 displays an operable menu for selecting an imaging menu and/or an image obtained by imaging the sample 40. Further, a sample loading door 13, which is capable of being opened and closed in order to load a sample 40 as a subject, is provided on the lower part of the front surface of the housing 11. In addition, on the side surface of the housing 11, there is a filter replacement window 14 for replacing a filter or the like used for imaging.

The housing 11 forms a closed space inside by closing the sample loading door 13 and the filter replacement window 14. The closed space is a space that forms a substantially constant imaging environment without being affected by the outside. Therefore, it is possible to provide a ventilating opening in the housing 11 for cooling or the like of a built-in device. It can be said that the housing 11 forms a closed space inside in a case where the inner space forms an imaging environment which is substantially not affected by the outside even in a case where air or the like enters and exits through the ventilating opening.

Figure 2:
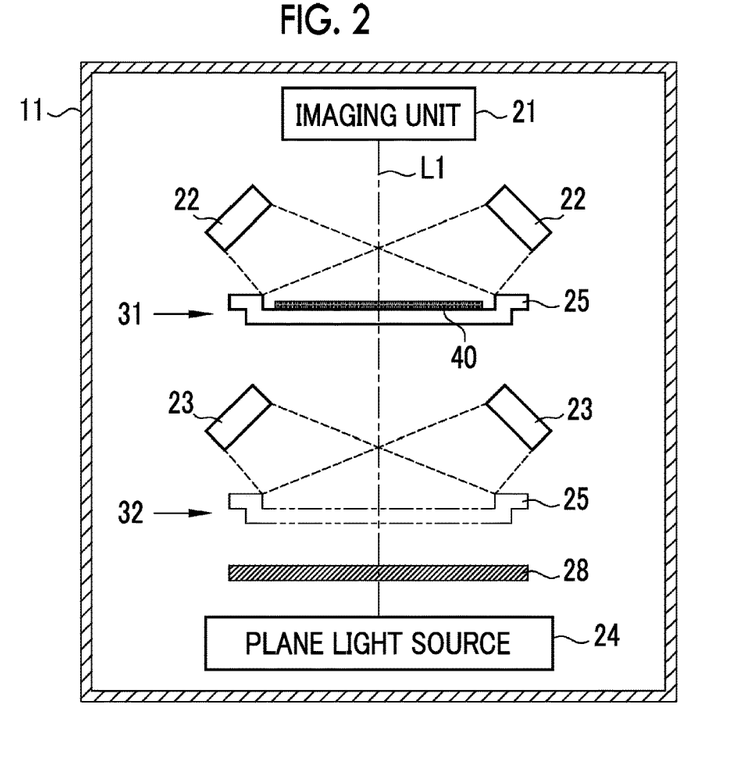
FIG. 2 is an explanatory diagram illustrating an optical configuration of a sample imaging apparatus.

As illustrated in FIG. 2, the sample imaging apparatus 10 comprises an imaging unit 21 that images the sample 40, a first epi-illumination light source 22, a second epi-illumination light source 23, and a plane light source 24, in the housing 11. The first epi-illumination light source 22, the second epi-illumination light source 23, and the plane light source 24 are arranged in this order from the imaging unit 21 present on the uppermost part in the housing 11, along an imaging optical axis L1 of the imaging unit 21.

A tray 25, on which the sample 40 is placed in the housing 11, is alternatively disposed at either of two positions, that is, a first position 31 or a second position 32. The first position 31 is between the first epi-illumination light source 22 and the second epi-illumination light source 23. The second position 32 is between the second epi-illumination light source 23 and the plane light source 24. In FIG. 2, the tray 25 is disposed at the first position 31. The tray 25 is made of, for example, glass and is transparent. The term "transparent" of the tray 25 means that the illumination light emitted by the plane light source 24 is transmitted to such an extent that the imaging unit 21 is able to image the sample 40 by using the tray 25. Further, the term "transparent" includes guiding the illumination light by diffusing, scattering, or diffracting the illumination light emitted by the plane light source 24 toward the imaging unit 21.

In a case where the tray 25 on which the sample 40 is placed is disposed at the first position 31, the first epi-illumination light source 22 indicates the sample 40 with the illumination light from the side of the imaging unit 21. The illumination light emitted by the first epi-illumination light source 22 is, for example, excitation light that causes fluorescent light from the sample 40 or the fluorescent reagent added to the sample 40 by exciting the sample 40 or the fluorescent reagent added to the sample 40. The first epi-illumination light source 22 is able to emit excitation light that excites, for example, a Cy2 dye (cyanine dye), a Cy3 dye (indocarbocyanine dye), a Cy5 dye (indodicarbocyanine dye) or the like. The Cy2 dye emits fluorescent light having a wavelength of about 510 nm by irradiating the dye with excitation light having a wavelength of about 492 nm. The Cy3 dye emits fluorescent light having a wavelength of about 570 nm by irradiating the dye with excitation light having a wavelength of about 550 nm. The Cy5 dye emits fluorescent light having a wavelength of about 670 nm by irradiating the dye with excitation light having a wavelength of about 650 nm. Besides, the first epi-illumination light source 22 is able to emit ultraviolet light and infrared light.

In a case where the tray 25 on which the sample 40 is placed is disposed at the second position 32, the second epi-illumination light source 23 irradiates the sample 40 with the illumination light from the side of the imaging unit 21. Further, the illumination light emitted by the second epi-illumination light source 23 is, for example, excitation light that causes fluorescent light from the sample 40 or the fluorescent reagent added to the sample 40 by exciting the sample 40 or the fluorescent reagent added to the sample 40. The illumination light (excitation light), which is capable of being emitted by the second epi-illumination light source 23, is the same as that of the first epi-illumination light source 22. That is, the first epi-illumination light source 22 and the second epi-illumination light source 23 each are an excitation light source which irradiates excitation light, which is for causing the sample 40 to emit fluorescent light, to the sample 40 placed on the tray 25 from the side of the lens 53 (refer to FIG. 3) included in the imaging unit 21.

The plane light source 24 emits illumination light to the sample 40 through the tray 25 disposed at the first position 31 or the second position 32 in the housing 11. In the sample imaging apparatus 10, the plane light source 24 is used as a so-called transmission light source. Further, the illumination light emitted by the plane light source 24 has a substantially uniform amount of light over substantially the entire portion (flat surface) of the tray 25 on which the sample 40 is placed. The plane light source 24 is able to emit red light, green light, blue light, or light (for example, white light) obtained by mixing two or more of them.

In addition to the above-mentioned description, a black insert (hereinafter referred to as a light blocking plate) 28 is capable of being freely inserted and removed between the tray 25 at the second position 32 and the plane light source 24.

Figure 3:
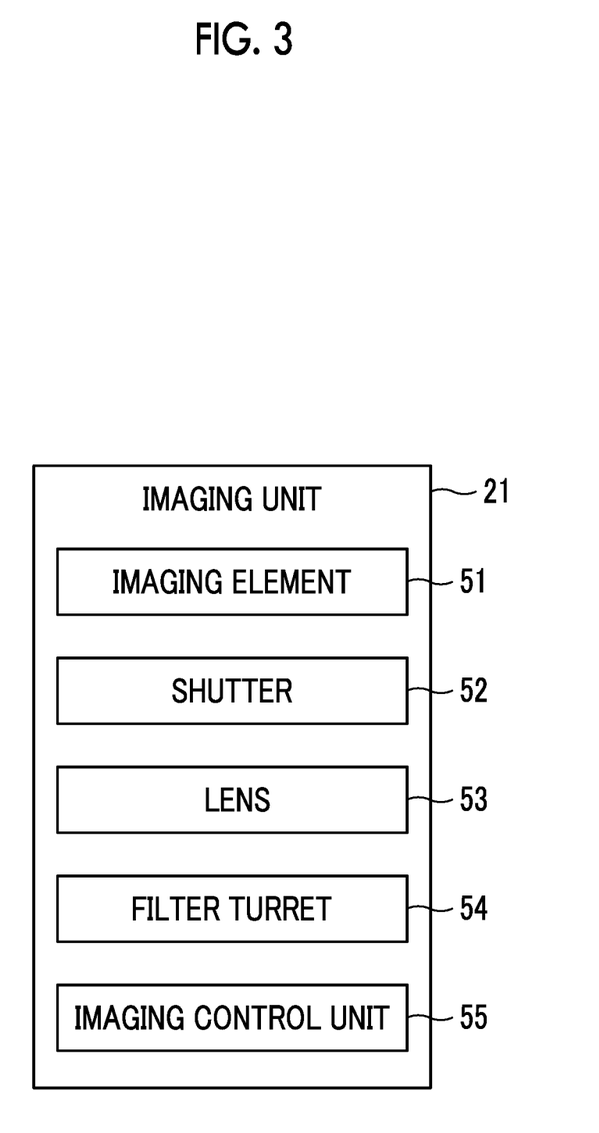
FIG. 3 is a block diagram of an imaging unit.

As illustrated in FIG. 3, the imaging unit 21 includes an imaging element 51, a shutter 52, a lens 53, a filter turret 54, and an imaging control unit 55. The imaging element 51 is, for example, a charge coupled device (CCD) sensor. The shutter 52 is a so-called mechanical shutter.

The imaging element 51 and the lens 53 are disposed in the housing 11 so as to face the plane light source 24 with the tray 25 interposed therebetween. The imaging element 51, the lens 53, and the filter turret 54 are used for imaging the sample 40.

Figure 4:
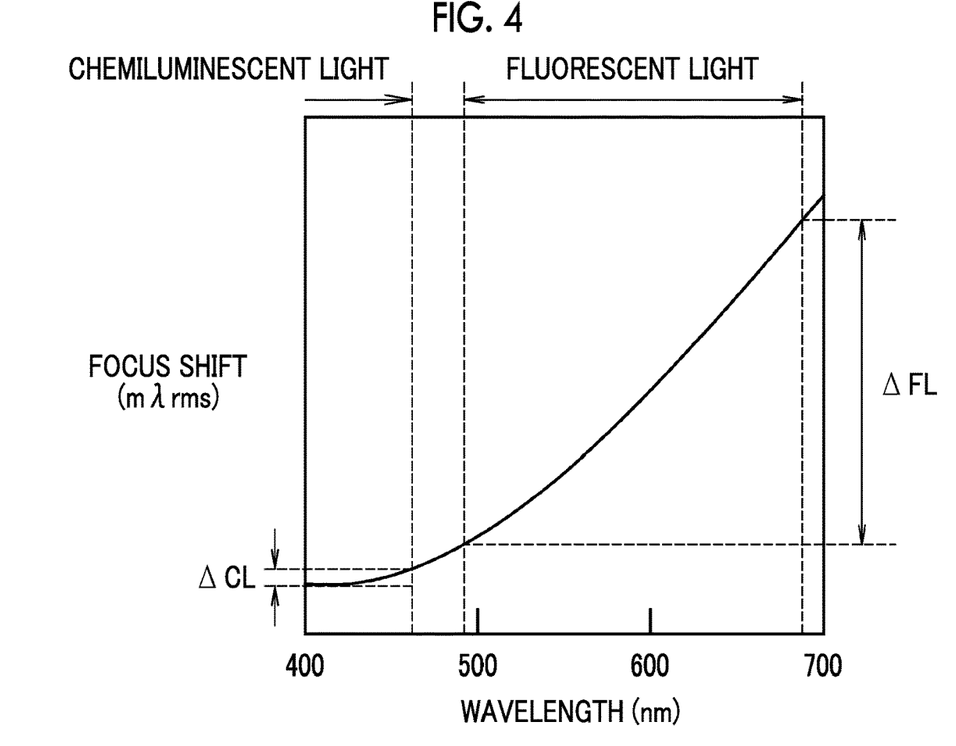
FIG. 4 is a graph illustrating longitudinal chromatic aberration of a lens used in a sample imaging apparatus.

The lens 53 is a lens in which longitudinal chromatic aberration in a wavelength range (hereinafter referred to as a wavelength range of chemiluminescent light of the sample 40) of chemiluminescent light (chemiluminescence) emitted by the sample 40 or a chemiluminescent reagent added to the sample 40 is corrected. More specifically, the lens 53 is a so-called achromatic lens, and as illustrated in FIG. 4, the longitudinal chromatic aberration of the lens 53 has a bell-shaped residual error. However, the general achromatic lens (comparative example) is adjusted such that the focus shift becomes zero at the F line and the C line. In contrast, the lens 53 used in the sample imaging apparatus 10 is characterized in that the focus shift becomes substantially infinitesimal and minimal in the wavelength range of the chemiluminescent light of the sample 40 or the like. Further, in the wavelength range of visible light (in particular, fluorescent light emitted by the sample 40), the focus shift of the lens 53 is greater as the wavelength is longer. Furthermore, an amount of focus shift ACL in the wavelength range of the chemiluminescent light is less than an amount of focus shift AFL in the wavelength range of the fluorescent light. In the present specification, the "wavelength range of the chemiluminescent light" is an emission band of the sample 40 or the chemiluminescent reagent (such as luminol) usually added to the sample 40, and refers to, for example, a wavelength range of about 350 nm to about 480 nm. In addition, in the present specification, the "wavelength range of the fluorescent light" refers to a wavelength range of the fluorescent light emitted by the sample 40 or a fluorescent reagent (such as Cy3 dye) generally added to the sample 40, for example, a wavelength of about 500 nm to about 700 nm.

Figure 5:
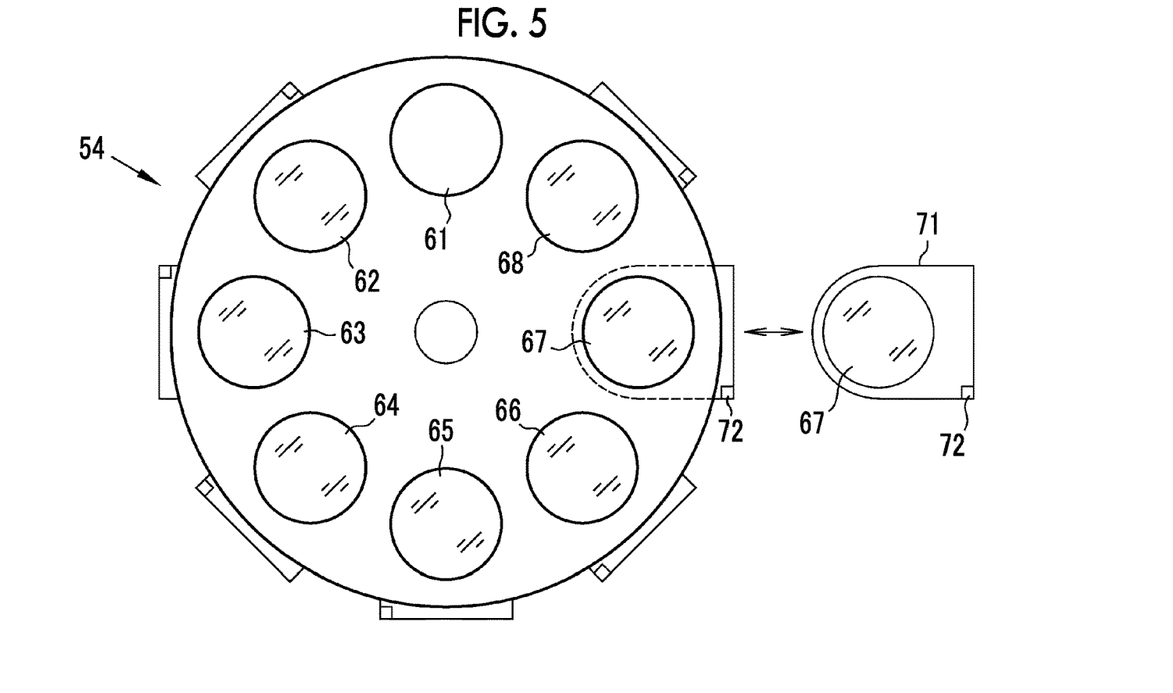
FIG. 5 is a filter turret.

As illustrated in FIG. 5, the filter turret 54 comprises a plurality of optical filters 61 to 68 disposed between the lens 53 and the sample 40. Then, by rotating the filter turret 54, any one of these optical filters 61 to 68 is capable of being selected and appropriately inserted on the imaging optical axis L1. The optical filters 61 to 68 include a plurality of optical filters for limiting the wavelength used for imaging. The sample imaging apparatus 10 automatically rotates the filter turret 54 in accordance with the imaging menu. Thereby, the sample imaging apparatus 10 automatically selects an optical filter appropriate for imaging among the optical filters 61 to 68 appropriate for imaging.

The optical filter 61 is a so-called "pass-through" and transmits light with substantially the entire wavelength range. For convenience of description, the optical filter 61 is defined to include a case where the optical filter is not actually provided. The optical filter 61, which is a pass-through, is used, for example, in a case where imaging is performed by using the chemiluminescent light of the sample 40. The optical filter 62 is, for example, an infrared (IR) long pass filter, and the optical filter 63 is, for example, an IR short pass filter. The optical filter 64 is, for example, a band pass filter for Cy5 dye, the optical filter 65 is, for example, a band pass filter for Cy3 dye and ultraviolet light, and the optical filter 66 is a band pass filter for Cy2 dye. The optical filter 67 and the optical filter 68 are custom filters optionally set by the user. Each of the optical filters 62 to 68 other than the optical filter 61 which is a pass-through is a filter unit 71 which is detachable from the filter turret 54, and all of them are replaceable. Since each filter unit 71 has an identifier 72 attached thereto, the sample imaging apparatus 10 is able to use the identifier 72 to identify what kind of optical filter is attached to which position on the filter turret 54.

In the filter turret 54, the optical filters 62 to 66 other than the optical filter 67 and the optical filter 68 which are custom filters are arranged from the vicinity of the optical filter 61 which is a pass-through, in the order of longer wavelengths (or in the order of shorter wavelengths). The reason for this is that the arrangement has to match with the imaging sequence for shortening the imaging time period.

The imaging control unit 55 controls each unit of the imaging unit 21. For example, the imaging control unit 55 adjusts the focal length of the lens 53 in accordance with the imaging menu. The imaging control unit 55 also performs the operation of the imaging element 51, the opening and closing of the shutter 52, the rotation of the filter turret 54 (selection of the optical filter), and the like in accordance with the imaging menu. In particular, in a case of changing the wavelength range of the fluorescent light emitted by the sample 40 and imaging one sample a plurality of times, the imaging control unit 55 adjusts the focal length of the lens 53 which is an achromatic lens in each imaging operation, and performs imaging operations in the order of the wavelengths of fluorescent light used for imaging.

Figure 6:
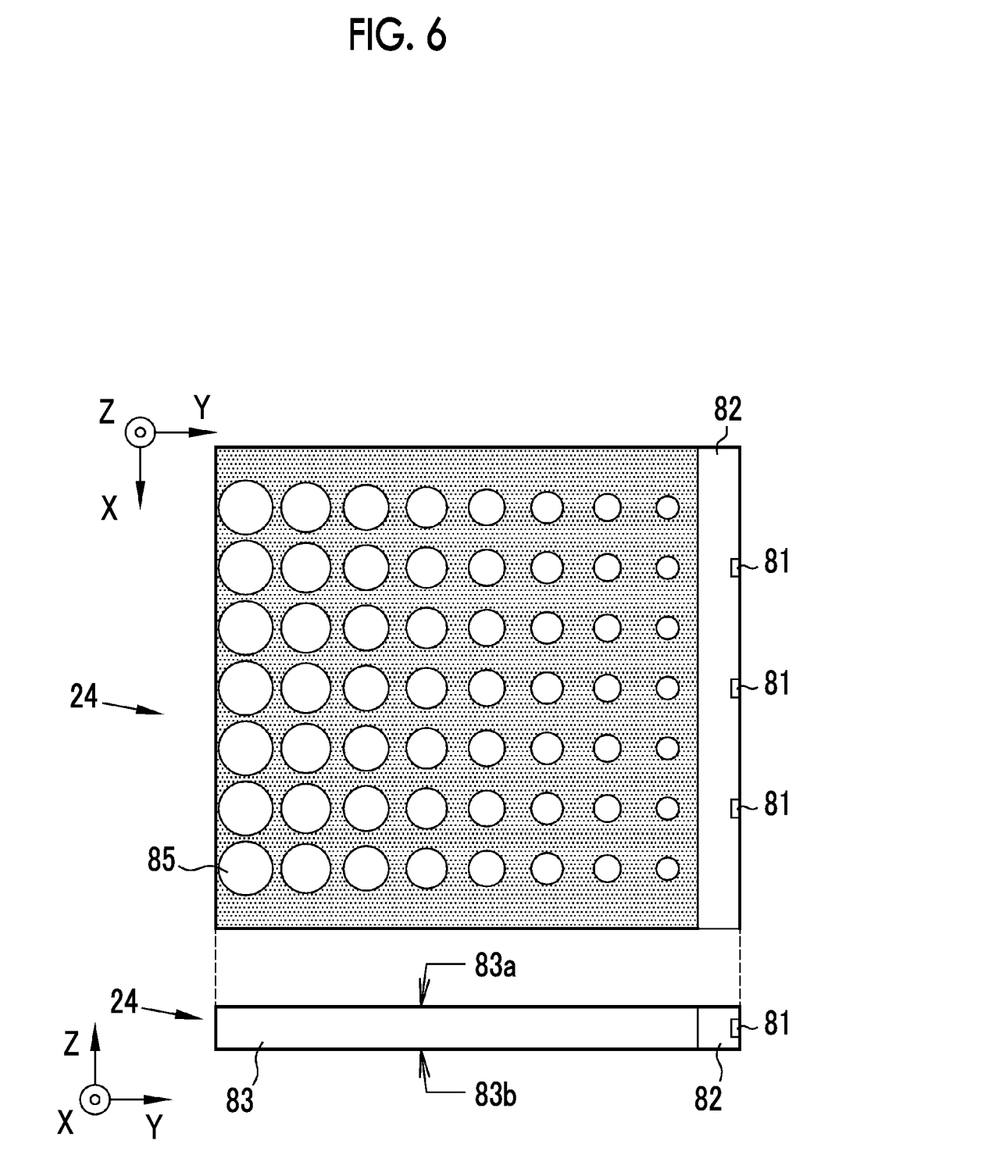
FIG. 6 is an explanatory diagram illustrating a configuration of a plane light source.

As illustrated in FIG. 6, the plane light source 24 is formed by using a light emitting unit 82 including one or more light emitting elements 81, and a light guide plate 83 having a flat plate shape that propagates the light emitted by the light emitting elements 81 in a plane direction (in an XY in-plane direction in FIG. 6). The light emitting element 81 is, for example, a light emitting diode (LED). The light guide plate 83 is connected to the light emitting unit 82 on the side surface. Therefore, the light emitted from the light emitting element 81 is incident into the light guide plate 83 from the side surface of the light guide plate 83. A light amount adjustment pattern 85 is provided on the surface 83b of the light guide plate 83 such that the amount of light emitted from the light guide plate 83 increases as the distance from the light emitting element 81 increases. The light amount adjustment pattern 85 is formed of a plurality of reflectors that reflect light propagating in the light guide plate 83, and the area of each reflector increases as the distance from the light emitting element 81 increases. On the other hand, for example, a diffusion film or a diffusion plate (not shown) is capable of being provided on the surface 83a facing the surface 83b (the surface facing the imaging unit 21 (lens 53) side) as needed. In the present embodiment, the light amount adjustment pattern 85 is formed of a reflector, but the light amount adjustment pattern 85 may be formed of a light blocker having a plurality of light transmitting portions (openings and the like). It is preferable that the light amount adjustment pattern formed by the light blocker is provided on the surface 83a of the light guide plate 83, and a reflective film or a reflector is provided on the surface 83b.

As compared with the plane light source constituted by using a reflection plate and a diffusion plate, the plane light source 24 configured as described above has a high light guiding efficiency. Therefore, it is possible to reduce the number of light emitting elements 81. As a result, the heat generation of the plane light source 24 is suppressed. In addition, it is possible to reduce the environmental change in the housing 11 constituting the closed space.

Figure 7:
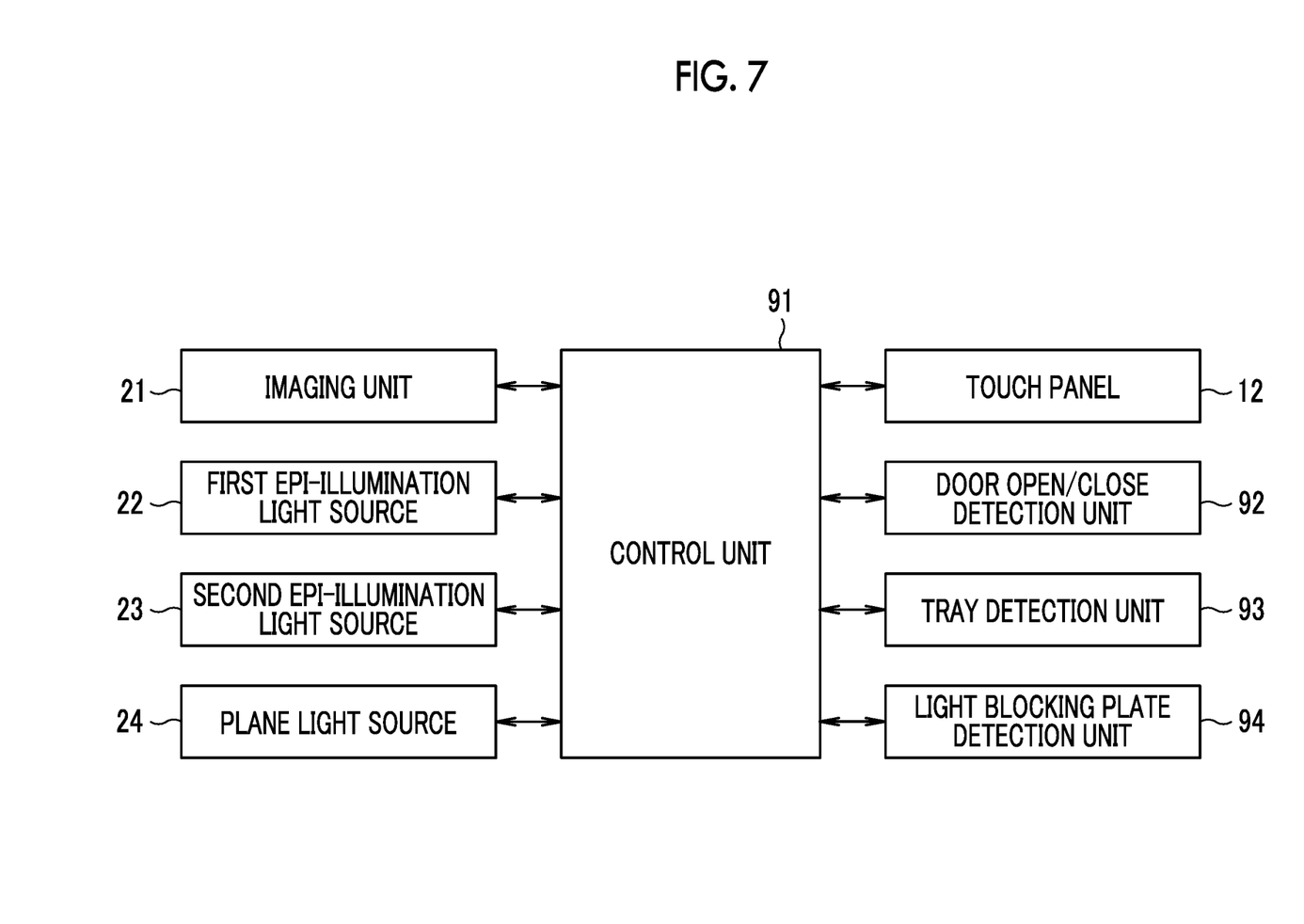
FIG. 7 is a block diagram illustrating an electrical configuration of a sample imaging apparatus.

In addition to the above, as illustrated in FIG. 7, the sample imaging apparatus 10 comprises a control unit 91, a door open/close detection unit 92, a tray detection unit 93, and a light blocking plate detection unit 94.

The control unit 91 integrally controls each part of the sample imaging apparatus 10. For example, the first epi-illumination light source 22, the second epi-illumination light source 23, and the plane light source 24 are turned on or off. Further, the control unit 91 controls each unit of the imaging unit 21 through the imaging control unit 55, and performs imaging of the sample 40 in an appropriate imaging sequence in accordance with the imaging menu.

The door open/close detection unit 92 detects open/close states of the sample loading door 13 and the filter replacement window 14. The tray detection unit 93 detects the tray 25. The detection of the tray 25 is detection as to whether or not the tray 25 is disposed in the housing 11 and detection as to which of the first position 31 and the second position 32 the tray 25 is disposed. The light blocking plate detection unit 94 detects that the light blocking plate 28 is inserted. The detection of the light blocking plate 28 is detection as to whether or not the light blocking plate 28 is inserted on the imaging optical axis L1. The control unit 91 controls the operation of the sample imaging apparatus 10 by using the detection results of these detection units.

Figure 8:
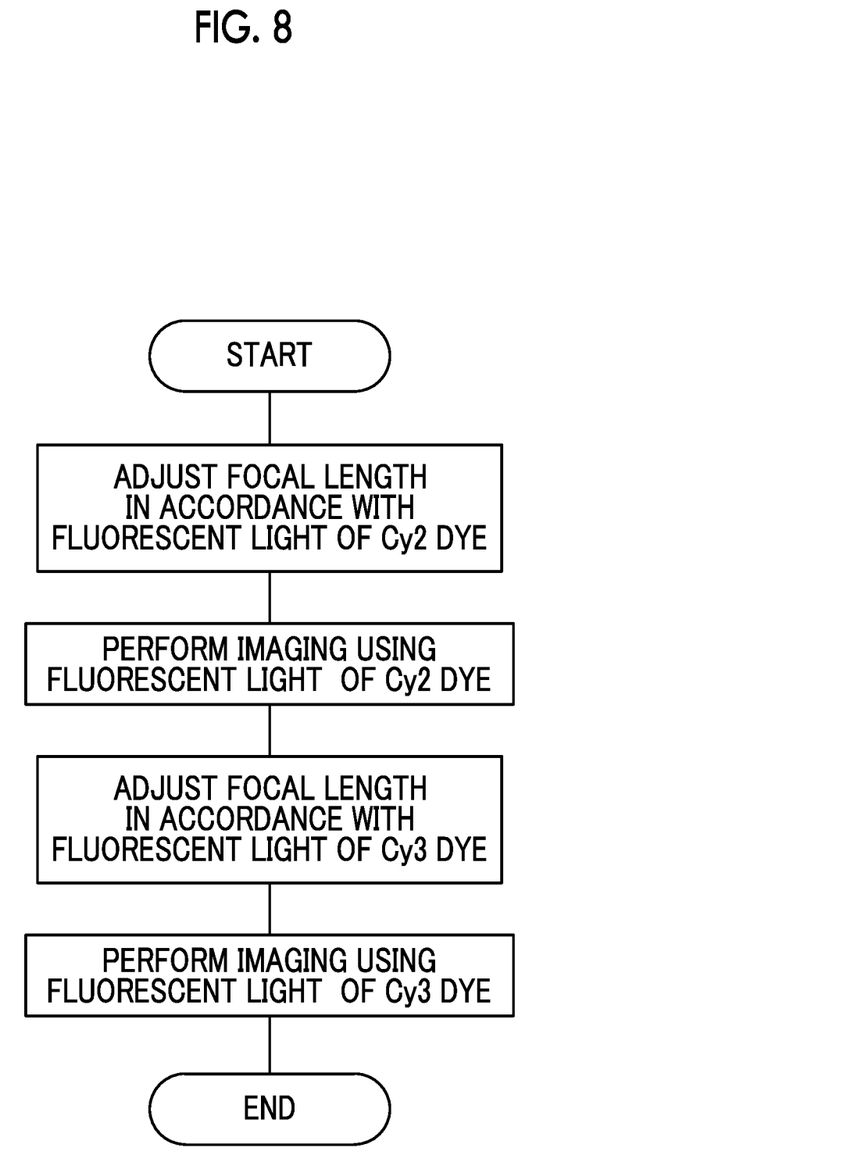
FIG. 8 is a flowchart in a case of performing imaging by using a plurality of types of fluorescent light.

Hereinafter, an operation sequence of the sample imaging apparatus 10 configured as described above will be described. First, in a case of imaging the sample 40 by using a plurality of types of fluorescent light, the sample imaging apparatus 10 adjusts the focal length of the lens 53 for each imaging. That is, in a case of imaging one sample 40, the imaging control unit 55 adjusts the focal length of the lens 53 a plurality of times, thereby performing imaging. Further, a state of focusing on a long wavelength side changed from a state of focusing on a short wavelength side is compared with the state of focusing on the short wavelength side changed from the state of focusing on the long wavelength side. In a case where an error of the focal length is smaller in the state of focusing on the long wavelength side changed from the state of focusing on the short wavelength side, imaging is performed sequentially from imaging using the light with a short wavelength. For example, as illustrated in FIG. 8, in a case where the error of the focal length is smaller in the state of focusing on the long wavelength side changed from the state of focusing on the short wavelength side, the imaging using the fluorescent light of the Cy2 dye and the imaging using the fluorescent light of the Cy3 dye may be performed. In this case, first, imaging is performed by performing focusing for imaging using the fluorescent light of Cy2 dye that emits fluorescent light with a shorter wavelength, and then imaging is performed second by performing focusing for imaging using the fluorescent light of Cy3 dye that emits fluorescent light with a relatively longer wavelength. It is the same for a case of performing imaging using the fluorescent light of the Cy3 dye and imaging using the fluorescent light of the Cy5 dye. It is the same for a case of performing imaging using the fluorescent light of the Cy2 dye and imaging using the fluorescent light of the Cy5 dye. Then, in a case of performing imaging using the fluorescent light of the Cy2 dye, imaging using the fluorescent light of the Cy3 dye, and imaging using the fluorescent light of the Cy5 dye, first, imaging using the fluorescent light of the Cy2 dye is performed, second, imaging using the fluorescent light of the Cy3 dye is performed, and third, imaging using the fluorescent light of the Cy5 dye is performed. It is the same for a case of performing imaging using three or more types of fluorescent light. It is the same for a case of using fluorescent dyes other than the Cy2 dye, the Cy3 dye, and the Cy5 dye.

On the contrary to the above, a state of focusing on a long wavelength side changed from a state of focusing on a short wavelength side is compared with the state of focusing on the short wavelength side changed from the state of focusing on the long wavelength side. In a case where an error of the focal length is smaller in the state of focusing on the short wavelength side changed from the state of focusing on the long wavelength side, the sample imaging apparatus 10 performs imaging sequentially from imaging using the fluorescent light with a long wavelength. For example, the imaging using the fluorescent light of the Cy2 dye and the imaging using the fluorescent light of the Cy3 dye may be performed. In this case, imaging is performed by performing focusing for imaging using the fluorescent light of Cy3 dye that emits fluorescent light with a longer wavelength, and then imaging is performed by performing focusing for imaging using the fluorescent light of Cy2 dye that emits fluorescent light with a relatively shorter wavelength. It is the same for a case of performing imaging using the fluorescent light of the Cy3 dye and imaging using the fluorescent light of the Cy5 dye. It is the same for a case of performing imaging using the fluorescent light of the Cy2 dye and imaging using the fluorescent light of the Cy5 dye. Then, in a case of performing imaging using the fluorescent light of the Cy2 dye, imaging using the fluorescent light of the Cy3 dye, and imaging using the fluorescent light of the Cy5 dye, first, imaging using the fluorescent light of the Cy5 dye is performed, second, imaging using the fluorescent light of the Cy3 dye is performed, and third, imaging using the fluorescent light of the Cy2 dye is performed. It is the same for a case of performing imaging using three or more types of fluorescent light. It is the same for a case of using fluorescent dyes other than the Cy2 dye, the Cy3 dye, and the Cy5 dye.

As described above, by performing focusing for each imaging, it is possible to obtain an image with high image quality that is in focus in each imaging. Then, in a case of performing a plurality of imaging operations, by sequentially performing imaging from imaging using light of a relatively shorter wavelength (or longer wavelength), it is possible to obtain the image with high image quality that is in focus in each imaging operation even in a case where the plurality of imaging operations are sequentially performed. The reason for this is that it is possible to reduce backlash of a gear or the like for driving the lens 53. It is the same for a case of sequentially performing imaging using three or more types of fluorescent light.

The lens 53 is an achromatic lens in which longitudinal chromatic aberration is corrected in the wavelength range of the chemiluminescent light of the sample 40. Therefore, by using the lens 53 for imaging, as compared with a case of using an achromatic lens in which longitudinal chromatic aberration is corrected in the wavelength range of the fluorescent light, the resolution of the captured image of the chemiluminescent light of the sample 40 is improved. On that basis, imaging in the wavelength range of the fluorescent light is performed as in the above-mentioned imaging sequence. Therefore, it is possible to obtain an image with high resolution even in the imaging in the wavelength range of the fluorescent light. That is, the sample imaging apparatus 10 is able to obtain high-resolution images in the imaging using the chemiluminescent light of the sample 40 and the imaging using the fluorescent light of the sample 40, respectively.

In the above-mentioned embodiment, the lens 53 is an achromatic lens, but the sample imaging apparatus 10 is able to use a lens other than an achromatic lens. In such a case, the imaging sequence of the above-mentioned embodiment can be used in a case where imaging is performed a plurality of times by changing the wavelength of the fluorescent light used for imaging within the range of wavelengths where the focus shift is monotonically large or small from the short wavelength range to the long wavelength range.

In addition, in the above-mentioned embodiment, the sample imaging apparatus 10 adjusts the focal length of the lens 53 for each imaging in a case of imaging one sample 40 a plurality of times. However, as a matter of course, the sample imaging apparatus 10 adjusts the focal length of the lens 53 also in a case of imaging one sample 40 once.

In the above-mentioned embodiment, the sample imaging apparatus 10 uses the lens 53 capable of adjusting the focal length, but the sample imaging apparatus 10 is able to image the sample 40 through a single focus lens instead of the lens 53. In such a case, in a case of imaging one sample 40, the imaging control unit 55 performs imaging by focusing on the sample 40 through the single focus lens.

Figure 9:
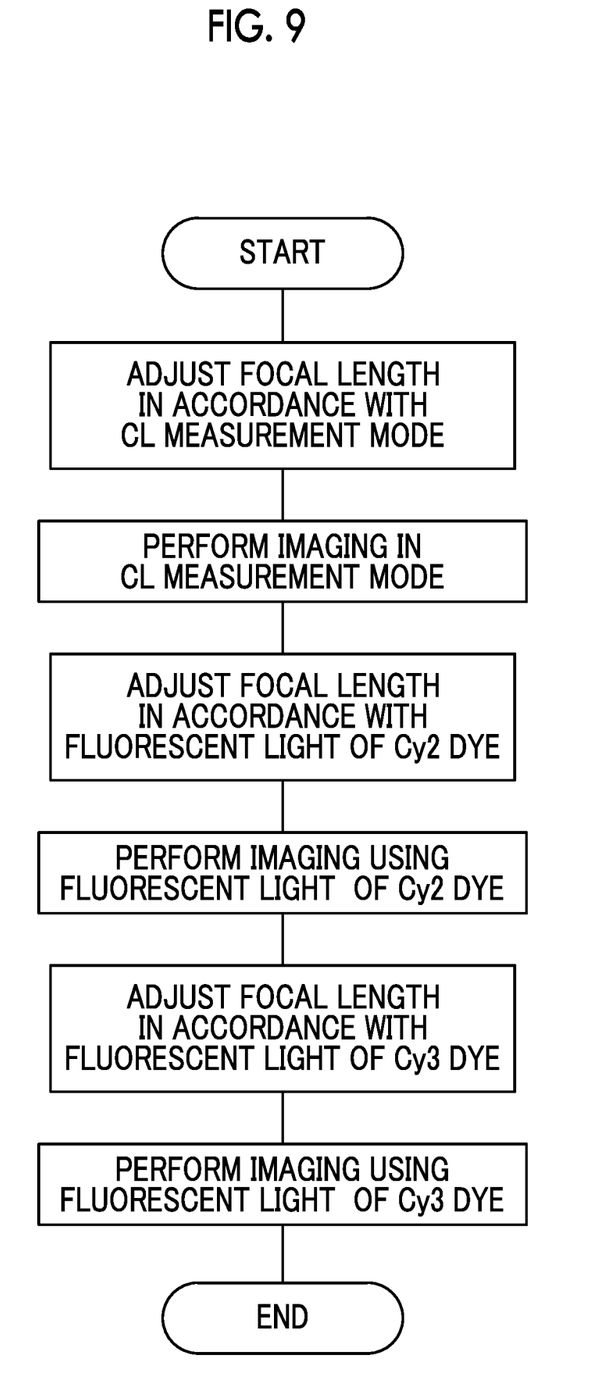

In a case of performing imaging using chemiluminescent light of the sample 40 or the like is performed, for example, as illustrated in FIG. 9, the sample imaging apparatus 10 first performs imaging using the chemiluminescent light. The reason for this is that the chemiluminescent light becomes weak as time passes. Thereafter, imaging using fluorescent light is performed. The reason for this is that it is possible to adjust the emission intensity of fluorescent light by performing adjustment of the irradiation intensity of the excitation light or the like. The imaging using the fluorescent light is performed in the order of reducing the error of the focal length due to backlash as described above.

The sample imaging apparatus 10 is able to comprise an image processing unit (not shown) that corrects distortion and/or lateral chromatic aberration of the lens 53. In such a case, it is possible to improve the image quality of the image displayed on the touch panel 12. Further, the sample imaging apparatus 10 is able to comprise: a housing temperature detection unit (not shown) that detects a temperature change in the housing 11; and a focus verification calculation unit (not shown) that calculates an amount of variation in focal length of the lens 53 by using a temperature in the housing 11. In such a case, the imaging control unit 55 adjusts the focal length of the lens 53 in the imaging of the sample 40 by using the amount of variation in focal length. As a result, even in a case where there is a temperature change in the housing 11, it is possible to continue imaging with the focal length of the lens 53 appropriately adjusted.

In a case where a plurality of imaging operations are performed, the images obtained through the respective imaging operations are capable of being sequentially displayed on the touch panel 12. In a case where a part or all of the imaging operations is completed, the images obtained through the respective imaging operations may be arranged and displayed on the touch panel 12. Further, in the case of performing the plurality of imaging operations, it is also possible to display, on the touch panel 12, a composite image obtained by combining a part or all of the images obtained through the respective imaging operations.

In a case where the light blocking plate 28 is inserted between the tray 25 and the plane light source 24, the control unit 91 is able to prevent the plane light source 24 from emitting light.

In a case where the light blocking plate 28 is removed from between the tray 25 and the plane light source 24, the control unit 91 prevents the first epi-illumination light source 22 and the second epi-illumination light source 23 from emitting light. In a case where the light blocking plate 28 is inserted between the tray 25 and the plane light source 24, it is possible to permit the first epi-illumination light source 22 and the second epi-illumination light source 23 to emit light. The reason for this is to appropriately perform imaging using the first epi-illumination light source 22 and the second epi-illumination light source 23.

The control unit 91 is able to issue notification of a warning in a case of removing the light blocking plate 28 from between the tray 25 and the plane light source 24 and attempting to perform imaging of the sample 40 using the fluorescent light. The term "warning" is defined to include display of a message on the touch panel 12 and the like.

The sample imaging apparatus 10 has a live view mode in which the plane light source 24 is turned off and a moving image of the sample 40 placed on the tray 25 is captured. The moving image in the live view mode is displayed on the touch panel 12. Further, for example, in a case where the sample loading door 13 is opened, the control unit 91 executes the live view mode. In addition, in a case where the sample loading door 13 is opened and the tray 25 is set, the control unit 91 is able to execute the live view mode until the sample loading door 13 is closed.

The control unit 91 stops the drive (rotation operation or the like) of the filter turret 54, in a case where the sample loading door 13 is opened. This is for safety since the user is likely to touch the filter turret 54.

The control unit 91 is able to prevent the first epi-illumination light source 22 and the second epi-illumination light source 23, which are excitation light sources, from emitting light in a case where the sample loading door 13 is opened. Similarly, the control unit 91 is able to prevent the plane light source 24 from emitting light in a case where the sample loading door 13 is opened. Each of these light sources has high brightness and is therefore safe.

In the above-mentioned embodiment, the hardware structure of the processing unit, which executes various kinds of processing of the imaging control unit 55, the control unit 91, and the like, is various processors as described below. The various processors include: a central processing unit (CPU) and a graphic processing unit (GPU) that are general purpose processors which execute software (programs) and function as various processing units; a programmable logic device (PLD) that is a processor capable of changing a circuit configuration after manufacture of a field programmable gate array (FPGA) or the like; and a dedicated electric circuit that is a processor having a circuit configuration specially designed to execute various processes.

One processing unit may be configured as one of these various types of processors, or may be configured as a combination of two or more processors of the same or different types (such as a plurality of FPGAs, a combination of a CPU and an FPGA, or a combination of a CPU and a GPU). Further, a plurality of processing units may be configured as one processor. As an example in which a plurality of processing units are configured as one processor, there is a following configuration. First, one processor is configured as a combination of one or more CPUs and software as typified by computers such as clients and servers, and this processor functions as a plurality of processing units. Second, as typified by a system on chip (SoC) or the like, there is a configuration using a processor in which the function of the whole system including the plurality of processing units is implemented by one integrated circuit (IC) chip. In such a manner, the various processing units are configured using one or more of the above-mentioned various processors as a hardware structure.

The hardware structures of these various processors each are, more specifically, an electrical circuit (circuitry) having a configuration in which circuit elements such as semiconductor elements are combined.

EXPLANATION OF REFERENCES

10: sample imaging apparatus
11: housing
12: touch panel
13: sample loading door
14: filter replacement window
21: imaging unit
22: first epi-illumination light source
23: second epi-illumination light source
24: area light source
25: tray
28: light blocking plate
31: first position
32: second position
40: sample
51: imaging element
52: shutter
53: lens
54: filter turret
55: imaging control unit
61 to 68: optical filter
71: filter unit
72: identifier
81: light emitting element
82: light emitting unit
83: light guide plate
83a, 83b: surface
85: light adjustment pattern
91: control unit
92: door open/close detection unit
93: tray detection unit
94: light blocking plate detection unit
L1: imaging optical axis

What is claimed is:

1. A sample imaging apparatus comprising:
an imaging unit that images a sample by using an achromatic lens in which longitudinal chromatic aberration is corrected in a wavelength range of chemiluminescent light of the sample, wherein the imaging unit includes an imaging sensor;
an excitation light source that irradiates the sample with excitation light for causing the sample to emit fluorescent light; and
processor that adjusts a focal length of the achromatic lens in each imaging in a case of imaging the single sample a plurality of times by changing a wavelength range of the fluorescent light emitted by the sample, and performs imaging in a wavelength order of the fluorescent light used for the imaging.

2. The sample imaging apparatus according to claim 1, wherein in a case where an error of a focal length in a state of focusing on a long wavelength side changed from a state of focusing on a short wavelength side is smaller than an error of the focal length in the state of focusing on the short wavelength side changed from the state of focusing on the long wavelength side, imaging is performed sequentially from imaging using the fluorescent light with a short wavelength.

3. The sample imaging apparatus according to claim 2, wherein in a case of performing imaging using fluorescent light of a Cy2 dye and imaging using fluorescent light of a Cy3 dye, the imaging using the fluorescent light of the Cy2 dye is performed, and then the imaging using the fluorescent light of the Cy3 dye is performed.

4. The sample imaging apparatus according to claim 2, wherein in a case of performing imaging using fluorescent light of a Cy3 dye and imaging using fluorescent light of a Cy5 dye, the imaging using the fluorescent light of the Cy3 dye is performed, and then the imaging using the fluorescent light of the Cy5 dye is performed.

5. The sample imaging apparatus according to claim 2, wherein in a case of performing imaging using fluorescent light of a Cy2 dye and imaging using fluorescent light of a Cy5 dye, the imaging using the fluorescent light of the Cy2 dye is performed, and then the imaging using the fluorescent light of the Cy5 dye is performed.

6. The sample imaging apparatus according to claim 2, wherein in a case of performing imaging using fluorescent light of a Cy2 dye, imaging using fluorescent light of a Cy3 dye, and imaging using fluorescent light of a Cy5 dye, first, the imaging using the fluorescent light of the Cy2 dye is performed, second, the imaging using the fluorescent light of the Cy3 dye is performed, and third, the imaging using the fluorescent light of the Cy5 dye is performed.

7. The sample imaging apparatus according to claim 1, wherein in a case where an error of the focal length in a state of focusing on a short wavelength side changed from a state of focusing on a long wavelength side is smaller than an error of the focal length in the state of focusing on the long wavelength side changed from the state of focusing on the short wavelength side, imaging is performed sequentially from imaging using the fluorescent light with a long wavelength.

8. The sample imaging apparatus according to claim 2, wherein in a case of performing imaging using fluorescent light of a Cy2 dye and imaging using fluorescent light of a Cy3 dye, the imaging using the fluorescent light of the Cy3 dye is performed, and then the imaging using the fluorescent light of the Cy2 dye is performed.

9. The sample imaging apparatus according to claim 2, wherein in a case of performing imaging using fluorescent light of a Cy3 dye and imaging using fluorescent light of a Cy5 dye, the imaging using the fluorescent light of the Cy5 dye is performed, and then the imaging using the fluorescent light of the Cy3 dye is performed.

10. The sample imaging apparatus according to claim 2, wherein in a case of performing imaging using fluorescent light of a Cy2 dye and imaging using fluorescent light of a Cy5 dye, the imaging using the fluorescent light of the Cy5 dye is performed, and then the imaging using the fluorescent light of the Cy2 dye is performed.

11. The sample imaging apparatus according to claim 2, wherein in a case of performing imaging using fluorescent light of a Cy2 dye, imaging using fluorescent light of a Cy3 dye, and imaging using fluorescent light of a Cy5 dye, first, the imaging using the fluorescent light of the Cy5 dye is performed, second, the imaging using the fluorescent light of the Cy3 dye is performed, and third, the imaging using the fluorescent light of the Cy2 dye is performed.

12. The sample imaging apparatus according to claim 1, wherein in a case where imaging using the chemiluminescent light of the sample and imaging using the fluorescent light of the sample are performed, the imaging using the chemiluminescent light is performed, and then the imaging using the fluorescent light is performed.

* * * * *